(12) United States Patent
Handler

(10) Patent No.: US 7,857,453 B2
(45) Date of Patent: Dec. 28, 2010

(54) METHOD AND APPARATUS FOR THE TRANSPORT OF A MOVIE FILM

(75) Inventor: Josef Handler, Vienna (AT)

(73) Assignee: Arnold & Richter Cine Technik GmbH & Co., Munich (DE)

( * ) Notice: Subject to any disclaimer, the term of this patent is extended or adjusted under 35 U.S.C. 154(b) by 950 days.

(21) Appl. No.: 11/631,500

(22) PCT Filed: Jul. 5, 2005

(86) PCT No.: PCT/DE2005/001205
§ 371 (c)(1),
(2), (4) Date: Jan. 3, 2007

(87) PCT Pub. No.: WO2006/005318
PCT Pub. Date: Jan. 19, 2006

(65) Prior Publication Data
US 2007/0229763 A1    Oct. 4, 2007

(30) Foreign Application Priority Data
Jul. 6, 2004    (DE) ................ 10 2004 033 590

(51) Int. Cl.
*G03B 1/32*    (2006.01)
(52) U.S. Cl. ............... 352/183; 352/225; 352/223
(58) Field of Classification Search ............ 352/183, 352/223, 225, 226, 227, 228; 348/96, 97, 348/102
See application file for complete search history.

(56) References Cited
U.S. PATENT DOCUMENTS

| | | | | |
|---|---|---|---|---|
| 3,730,616 A | * | 5/1973 | Fliesser | 352/166 |
| 4,190,185 A | * | 2/1980 | Thate | 226/172 |
| 4,427,273 A | * | 1/1984 | Mackereth et al. | 352/183 |
| 4,474,342 A | * | 10/1984 | Nater | 242/343.2 |
| 4,655,566 A | * | 4/1987 | Heiniger | 352/225 |

(Continued)

FOREIGN PATENT DOCUMENTS

DE    31 44 333 A1    5/1983

(Continued)

OTHER PUBLICATIONS

English translation of International Preliminary Report on Patentability dated Jan. 9, 2007 for corresponding PCT application No. PCT/DE2005/001205.

(Continued)

*Primary Examiner*—William C Dowling
(74) *Attorney, Agent, or Firm*—Christie, Parker & Hale, LLP

(57) ABSTRACT

A method for the transport of a movie film along a film transport path, having a friction-locking connection of at least one section of the movie film to a film transport means, which is moved continuously or intermittently over a part of the film transport path, and having a pressing device which presses the movie film against the film transport means, between which and the film transport means the movie film is routed, is provided. The movie film is transported by means of feed and take-up devices, which each contain a film transport means and a pressing device and are arranged on both sides of a picture window.

23 Claims, 3 Drawing Sheets

U.S. PATENT DOCUMENTS 4,817,886 A * 4/1989 Yoshioka et al. .......... 242/332.2
4,973,150 A * 11/1990 Bryant ....................... 352/222
5,548,328 A * 8/1996 Wakefield .................... 348/98

FOREIGN PATENT DOCUMENTS

| DE | 198 31 211 A1 | 1/2000 |
|---|---|---|
| GB | 1 371 773 | 10/1974 |
| WO | WO 00/02086 | 1/2000 |
| WO | WO 03/067322 A1 | 8/2003 |

OTHER PUBLICATIONS

International Search Report, dated Nov. 4, 2005, corresponding to PCT/DE2005/001205.

* cited by examiner

METHOD AND APPARATUS FOR THE TRANSPORT OF A MOVIE FILM

CROSS-REFERENCE TO A RELATED APPLICATION

This application is a National Phase Patent Application of International Patent Application Number PCT/DE2005/001205, filed on Jul. 5, 2005, which claims priority of German Patent Application Number 10 2004 033 590.7, filed on Jul. 6, 2004.

BACKGROUND

The invention relates to a method and an apparatus for the transport of a movie film along a film transport path.

DE 198 31 211 A1 discloses an apparatus for intermittent transport of a movie film which, parallel to the film transport direction, has at least one perforation hole row in which a toothed drum, which is toothed in a rolling form and is moved intermittently, engages for film transport and rough positioning of the movie film in front of a picture window. In addition, a positioning element which enters at least one perforation hole and ensures that the picture on the movie film is positioned exactly in front of the picture window is provided for fine positioning and fixing of the movie film in front of the picture window.

An apparatus such as this is used for reproduction and for editing of movie films in film projectors, film scanners and the like.

For the transport of archive films, for example of historical film material, possibly of film material which is over 100 years old, a perforation hole row which may be present is unsuitable, or is suitable only to a restricted extent for the transport of film by means of a toothed film roll or a toothed drum, since correct film transport is no longer ensured, or is possible only with considerable losses of quality in reproduction and in scanning of the movie film, as a result of shrinkage processes, lack of or damaged perforation holes and/or perforation hole shapes which are no longer in use. A further reason for dispensing with the use of conventional film transport apparatuses is the need for careful handling of film material which frequently cannot be restored.

SUMMARY

The present invention is thus based on the objective of specifying a method and an apparatus for the transport of a movie film along a film transport path, which ensures that the film is transported in a manner which protects the film material of the movie film but in the process ensures exact maintenance of the film transport steps and position of the film pictures in front of a picture window, allows different film transport speeds, and ensures simple handling.

An exemplary solution according to an exemplary embodiment of the invention ensures that the film material of a movie film is transported carefully, as well as exact maintenance of the film transport steps and position of the film pictures in front of a picture window, as well as simple handling, while allowing different film transport speeds.

The invention is based on the discovery that film transport by means of a friction lock between a suitable film transport means and progressing sections of the movie film allows the film material to be handled carefully, while avoidance of any slip between the film transport means, which is moved intermittently or in steps, and the movie film to be transported, ensures exact maintenance of the film transport steps and positioning of the movie film in front of a picture window. Since the friction lock between the film transport means and the movie film can be provided on different areas of the movie film, this at the same time ensures that contacts with the film pictures are avoided, in particular in such a manner that there is a minimal risk of damage to the film picture surface of the movie film during the production or during scanning of archive films.

The film is preferably transported by continuous, friction-locked contact between the film transport means and at least one face of the movie film, so that no intermittent contact occurs between the film transport means and the movie film, thus on the one hand protecting the film material and on the other hand preventing the occurrence of uncontrolled movements of the movie film.

A further feature for careful handling of the film material during film transport comprises a continuous, friction-locking contact between the film transport means and the coating face and/or mount face of the movie film.

Damage to the film pictures during film transport can be precluded by the film transport means making contact with the friction lock in the area of the side edges, in particular in the area of the film perforation or perforations in the movie film.

The friction lock between the film transport means and the respective section of the movie film which is connected with a friction lock to the film transport means is ensured in that the movie film is routed between the film transport means and a pressing device which presses the movie film against the film transport means, in particular with a friction-locking contact, in the form of a circular arc being provided between the movie film and the film transport means.

The arrangement of feed and take-up devices, which each contain a film transport means and a pressing device and transport the movie film, on both sides of a picture window ensures that the movie film is moved past the picture window in a defined manner without the unwinding and winding-up of the movie film from a feed plate and onto a take-up plate having any influence on the position of the picture at the picture window.

In order to simplify handling during insertion of the movie film into the film transport apparatus, the pressing device can be moved relative to the film transport means between a film insertion position and a film transport position.

One advantageous refinement of the solution according to the invention is characterized in that the movie film is routed from a feed plate via a plurality of first deflection rollers and a first compensation roller, which compensates for the intermittent film transport of the feed device, to the feed device, past the picture window to the take-up device as well as via a plurality of second deflection rollers and a second compensation roller, which compensates for the intermittent film transport of the take-up device, to a take-up plate.

The arrangement of a plurality of deflection rollers and in each case one compensation roller between the feed plate and the feed device, and between the take-up device and the take-up plate, ensures exact film guiding as well as maintenance of a constant tensile stress on the movie film, thus avoiding tearing effects, which could lead to damage to the movie film, as well as the production of noise.

An exemplary embodiment apparatus which achieves the objective for transport of a movie film along a film transport path is characterized by at least one film transport means, which is arranged in the film transport path, is connected to a drive device, rests with a friction lock on one section of the movie film, and moves this continuously or intermittently past a picture window.

One advantageous refinement of the film transport arrangement according to the invention is characterized in that the film transport means rests continuously and with a friction lock on sections of the movie film, in which case the film transport means preferably interacts with a pressing roller, between which and the film transport means the movie film is routed in the form of a circular arc, and whose coating face or mount face rests on the film transport means with a friction lock.

The film transport means preferably contains a pulling means, which in particular is flexible and is in the form of a strip, for example in the form of an endless belt, an endless toothed belt, an endless flat belt or a transport belt, in particular a profiled transport belt.

In order to preclude an uneven area on the surface of the film transport means which is in contact with the movie film, and to preclude damage to the movie film resulting from this, that side of the endless belt or transport belt which rests on the movie film with a friction lock can additionally be ground, or can be coated and ground.

For particularly careful handling of the movie film, the pressing roller can be provided with a smooth, preferably a rubber-coated, cylindrical surface which rests on the movie film.

In order to simplify the handling of the film transport apparatus during insertion of the movie film into the film transport apparatus and during removal of the movie film from the film transport apparatus, the pressing roll can move at right angles to the film transport path from a film transport position, which brings the movie film into friction-lock contact with the film transport means, to an insertion position, which is at a distance from the film transport means.

In one preferred embodiment, the endless belt or transport belt is placed around two drive rollers, which are separated from one another, and a tensioning roller, preferably a sprung tensioning roller, which is arranged between the drive rollers. This measure ensures a defined stress on the endless belt or the transport belt.

The drive for the film transport means can be designed in such a manner that at least one drive roller and/or the tensioning roller are/is connected to a drive device directly or via a belt intermediate gear.

For intermittent movement of the movie film past the picture window and for continuous unwinding of the movie film from a feed plate, as well as for continuous feed of the movie film onto a take-up plate, the film transport means and the tensioning roller are combined to form a feed and take-up device and on both sides of a picture window at least one deflection roller and a compensation roller, which compensates for the film transport movement are arranged between the feed and take-up device and feed and take-up plates, which hold the movie film, in the film transport path of the movie film, in which case the compensation roller compensates for the intermittent film transport by the feed and take-up device with respect to the continuous take-up and feed of the movie film from the feed plate and onto the take-up plate, and ensures an essentially constant film tension.

The film transport apparatus according to the invention is particularly suitable for use in a film projector or a film scanner.

BRIEF DESCRIPTION OF THE DRAWINGS

The idea on which the invention is based and further refinement features of the invention will be explained in more detail with reference to one exemplary embodiment, which is illustrated in the figures, in which.

DETAILED DESCRIPTION

Figure 1:
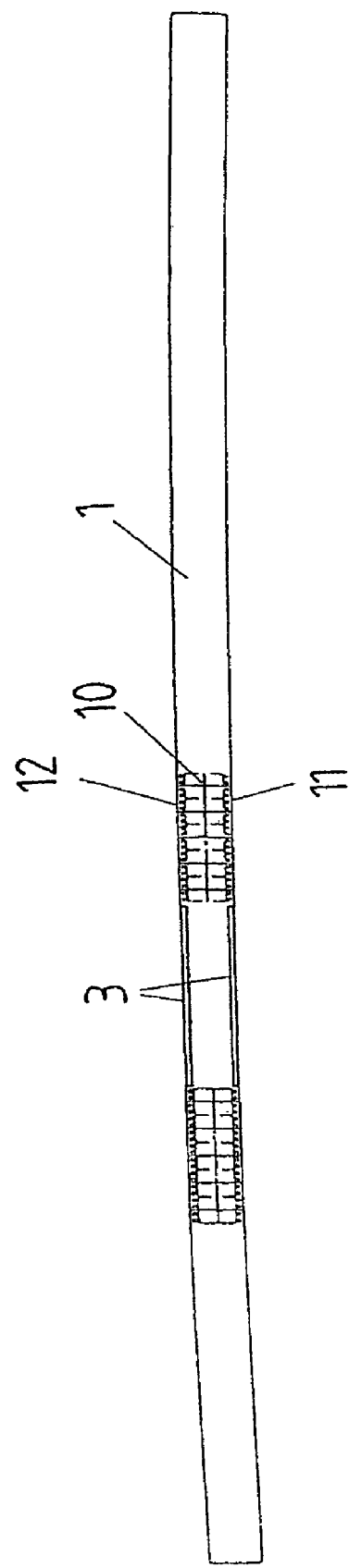
FIG. 1 shows a schematic plan view of a part of a movie film and of a film transport means, which is connected to the movie film with a friction lock, having a toothed belt.

The schematic plan view of a movie film 1 illustrated in FIG. 1 shows, in a part that is illustrated in detail, the perforation hole rows 11, 12 which are arranged on both sides of the film pictures 10 in the movie film 1. These perforation hole rows 11, 12, which are normally used for film transport, have, however, been found to be unsuitable for film transport in the case of archive films, as a result of damaged or missing perforation holes, as a result of shrinkage processes, or because of non-standard perforation hole shapes. Instead of using a film transport means which engages in or enters the perforation hole rows, a friction lock is produced between a part of the surface either of the coating face or mount face of the movie film 1 and a film transport means 3, 3', which, for example, contains a toothed belt 30, 30' whose untoothed belt rear side, in particular a smooth belt rear side, makes a friction-locking contact with the coating or mount face of the movie film 1.

Instead of a toothed belt 30, 30', any desired transport belt or flexible pulling means can be provided in the form of a flat belt, steel strip or the like, and can produce the required friction lock with the movie film 1. In order to protect the film material, that side of the flexible pulling means which makes contact with the movie film 1 can additionally be ground or coated and ground. Alternatively, it is also possible to provide a plurality of belts or transport belts which are guided parallel and whose rear faces, which make contact with the movie film 1, can likewise be ground or coated and ground.

Figure 2:
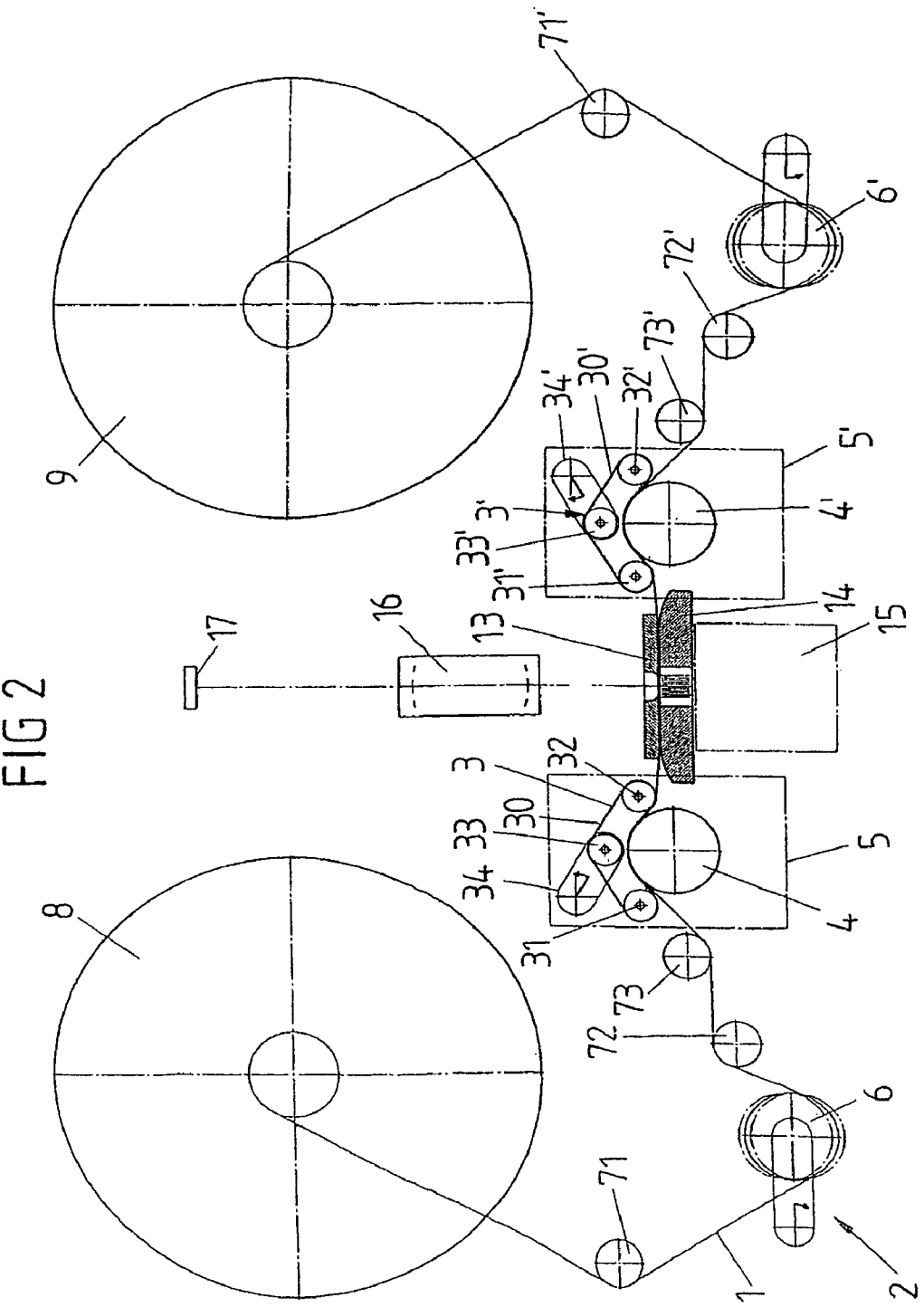
FIG. 2 shows a schematic plan view of a film transport apparatus for a film scanner, having a feed and take-up device which rests on the movie film with a friction lock and is moved intermittently or continuously.

The production of the friction lock between the film transport means 3, 3' and the movie film 1 will be explained in more detail in the following text with reference to the plan view, as illustrated in FIG. 2, of a film transport apparatus for a film scanner.

Since, in the case of the film transport apparatus illustrated in FIG. 2, the same components are used on both sides of a picture window 13 in the film transport path, the same reference symbols will also be provided for corresponding components, with the components in the transport path from a take-up device 5' to a take-up plate 9 differing by means of an additional apostrophe from the reference symbols of the components in the film transport path between a feed plate 8 and a feed device 5.

The movie film 1, which is held by the feed plate 8 before projection, scanning or film editing, is routed via a first deflection roller 71 to a sprung compensation roller 6, and from it via two further deflection rollers 72, 73 to the feed device 5. The movie film 1 passes from the feed device 5 into a film channel, which is formed between the picture window 13 and a film platform 14. The film platform 14 has an associated illumination unit 15 whose light beams pass through the film pictures 10 on the movie film 1 and are received by a picture sensor 17, by means of an objective 16, and are electronically scanned, for recording purposes.

The take-up device 5' is arranged behind the picture window 13 and the film platform 14 in the film transport direction and is followed by two deflection rollers 72', 73', a sprung compensation roller 6' as well as a further deflection roller 71' and the take-up plate 9 for holding the projected or edited movie film 1.

The feed and take-up devices 5, 5' contain a film transport means 3, 3' with a toothed belt 30, 30' in the form of an endless belt and with drive rollers 31, 32 respectively 31', 32', and with a sprung tensioning roller 33, 33', which is arranged between the drive rollers 31, 32; 31', 32'. The drive for the film transport means 3, 3' for the feed and take-up device 5, 5' is provided in the exemplary embodiment illustrated in FIG. 2 by means of a belt intermediate gear with a drive belt 34 which drives the sprung tensioning roller 33, 33'. Alternatively, a direct drive can be provided for one of the two drive rollers 31, 32 or 31', 32', or for the sprung tensioning roller 33, 33'.

In order to produce the pressure force that is required for a friction lock between the film transport means 3, 3' and the movie film 1, a pressing roller 4, 4' is in each case provided, which makes contact with the toothed belt 30, 30' for film transport and thus ensures that the movie film 1 is deflected in the form of a circular arc with a defined contact force from the toothed belt 30, 30' on the surface of the movie film 1. The pressing roller 4, 4' has a smooth or rubber-coated cylindrical surface which rests either on the coating face or on the mount face of the movie film 1, while the toothed belt 30, 30' rests in a corresponding manner on the mount face or on the coating face of the movie film, in particular on its edges as shown in FIG. 1.

Alternatively, a plurality of pressing rollers 4, 4' can also be provided, which produce a corresponding, defined contact pressure in order to produce an adequate friction lock between the film transport means 3, 3' and the movie film 1.

The sprung compensation roller 6, 6' which is provided in the film transport path between the feed plate 8 and the feed device 5, as well as between the take-up device 5' and the take-up plate 9, can move at right angles to the film transport path, as is indicated by the dashed-dotted lines in FIG. 2. The sprung compensation rollers 6, 6' on the one hand compensate for movement between the intermittent film transport of the feed and take-up device 5, 5' and the continuous feeding of the movie film 1 from the feed plate 8 and the continuous take-up of the movie film 1 onto the take-up plate 9, and on the other hand ensure the production of a constant feed or take-up tension, thus resulting in an essentially constant tensile stress being exerted on the movie film 1.

The continuous contact between the toothed belt 30, 30' of the film transport means 3, 3' and the movie film 1 during film transport with the friction lock avoids any intermittent contact between the film transport means 3, 3' and the movie film 1 in order to carry out intermittent film transport, thus ensuring careful handling of the film material.

Figure 3:
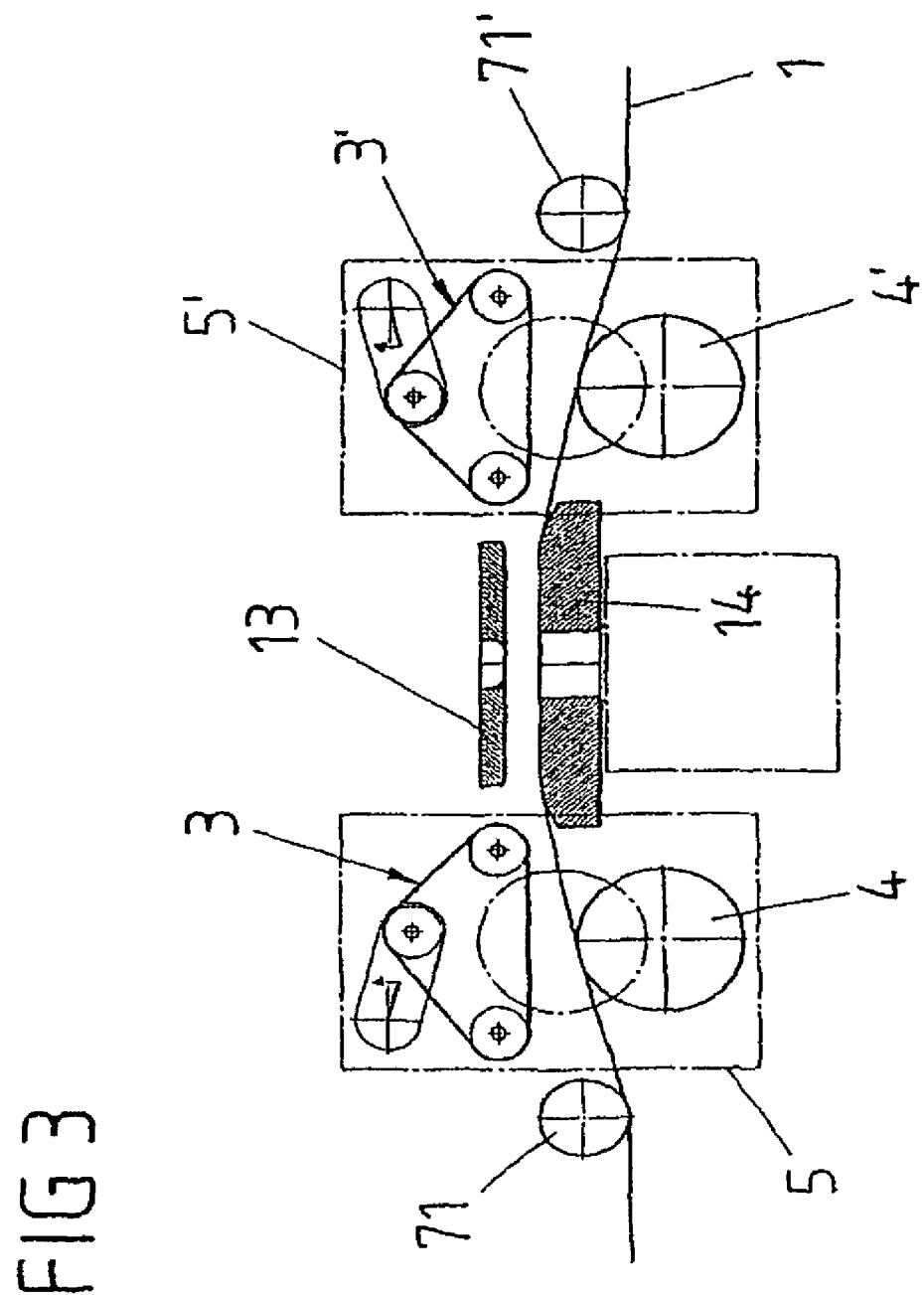
FIG. 3 shows a schematic plan view of the feed and take-up device and the picture window of the film transport apparatus as shown in FIG. 2, in a film insertion position.

FIG. 3 shows a part of the film transport apparatus 2 according to FIG. 2, which is in the form of a film scanner, with the feed and take-up device 5, 5' as well as the picture window 13 in a film insertion position in which, in these areas, the film path is open in order to simplify the insertion of the movie film and to simplify the removal of the movie film 1.

In order to open the film path, the pressing rollers 4, 4' of the feed and take-up device 5, 5' are moved back from the position, as illustrated by dashed-dotted lines, during film transport to the film insertion and film removal position illustrated by solid lines. In the same manner, the picture window 13 is moved from the position illustrated in FIG. 2 during film transport and exposure of the movie film 1 to the position illustrated in FIG. 3, so that, overall, the movie film 1 can be inserted into the film transport path without any problems, so that there is no need to thread in the movie film 1.

The invention claimed is:

1. A method for the transport of a movie film along a film transport path comprising:
   frictionally engaging the movie film to a film transport means by pressing the film against said film transport means using a pressing device, which can be moved relative to the film transport means between a film insertion position and a film transport position; and
   continuously or intermittently moving said movie film along at least part of the film transport path wherein said movie film is moved between said transport means and said pressing device.

2. The method of claim 1, wherein the movie film is transported by continuous frictional engagement between the film transport means and at least one face of the movie film.

3. The method of claim 2, wherein the film transport means frictionally engages at least partially a layer face or a mount face of the movie film.

4. The method of claim 3, wherein the film transport means frictionally engages an area of the movie film comprising a perforation.

5. The method of claim 1, wherein the movie film is moved by frictional engagement along a circular arc.

6. The method of claim 1, wherein said film transport means and said pressing device are part of a movie film feed device, the method further comprising:
   moving said movie film from a feed plate via a plurality of first deflection rollers and a first compensation roller which compensates for the intermittent film transport of the feed device past a picture window to a take-up device as well as via a plurality of second deflection rollers and a second compensation roller which compensates for the intermittent film transport of the take-up device, to a take-up plate.

7. An apparatus for the transport of a movie film along a film transport path comprising:
   at least one film transport means for frictionally engaging a section of the movie film, said film transport means being arranged in the film transport path and connected to a drive device, said film transport means moving said movie film continuously or intermittently past a picture window; and
   a pressing roller for pressing the movie film against the film transport means, wherein the movie film is moved between said pressing device and said film transport means;
   said pressing roller being moved perpendicularly to the film transport path from a film transport position which brings the movie film into frictional engagement with the film transport means, to an insertion position, which is at a distance from the film transport means.

8. The apparatus of claim 7, wherein the film transport means continuously frictionally engages a section of the movie film.

9. The apparatus of claim 7 or 8, wherein the film transport means interacts with a pressing roller, between which and the film transport means the movie film is moved along a circular arc.

10. The apparatus of claim 7, wherein the film transport means comprises at least a belt for frictionally engaging said movie film.

11. The apparatus of claim 7, wherein the pressing roller has a smooth cylindrical surface for engaging the movie film.

12. The apparatus of claim 7, wherein the pressing roller has a rubber-coated cylindrical surface for engaging the movie film.

13. The apparatus of claim 10, wherein the belt is placed around two drive rollers, which are separated from one another, and a tensioning roller, which is arranged between the drive rollers.

14. The apparatus of claim 13, wherein said tensioning roller is spring loaded.

15. The apparatus of claim 13, wherein at least one of said drive rollers and said tensioning roller is connected to the drive device.

16. The apparatus of claim 10, wherein the belt is selected from the group of belts consisting of endless toothed belts, endless flat belts and profiled transport belts.

17. The apparatus of claim 10, wherein at least one of said drive rollers and said tensioning roller is connected to the drive device via a belt intermediate gear.

18. The apparatus of claim 7, further comprising:
at least another film transport means for frictionally engaging said movie film, said another transport means being in the film transport path and connected to a drive device, said another transport means moving said movie film continuously or intermittently;
another pressing device for pressing the movie film against said another film transport means, wherein the movie film is moved between said another pressing device and said another film transport means, wherein said film transport means and said pressing device form a feed device and said another transport means and said another pressing device form a take-up device, wherein the feed device and the take-up device are arranged on either side of a picture window; and
at least one deflection roller and a compensation roller, which compensates for the film transport movement of the feed and take-up device, being arranged in the film transport path of the movie film between the feed and take-up device and feed and take-up plates, which hold the movie film.

19. The apparatus of claim 18, wherein the compensation roller is spring-loaded.

20. An apparatus for transporting a movie film along a film transport path comprising:
at least one film transport means for frictionally engaging a section of the movie film, said film transport means being arranged in said film transport path and connected to a drive device,
said film transport means moving said movie film continuously or intermittently past a picture window,
said film transport means comprising a belt for frictionally engaging said movie film,
said belt being placed around two drive rollers, which are separated from one another, and a spring loaded tensioning roller, which is arranged between said drive rollers, and
a pressing roller interacting with said belt for pressing the movie film against said belt to produce a pressure force that is required for the frictional engagement between said belt and said movie film, which is moved between said belt and said pressing roller along a circular arc.

21. A method for the transport of a movie film along a film transport path comprising:
frictionally engaging the movie film to a film transport means by pressing the film against said film transport means using a pressing device, wherein said film transport means and said pressing device are part of a movie film feed device;
continuously or intermittently moving said movie film along at least part of the film transport path wherein said movie film is moved between said transport means and said pressing device:
frictionally engaging the movie film to another film transport means by pressing the film against said another film transport means using another pressing device; and
continuously or intermittently moving said movie film along at least part of the film transport path wherein said movie film is moved between said another transport means and said another pressing device, wherein said another film transport means and said another pressing device are part of a movie film take-up device, wherein the movie film is moved from a feed plate via a plurality of first deflection rollers and a first compensation roller which compensates for the intermittent film transport of the feed device past a picture window to the take-up device as well as via a plurality of second deflection rollers and a second compensation roller which compensates for the intermittent film transport of the take-up device, to a take-up plate.

22. An apparatus for the transport of a movie film along a film transport path comprising:
at least one film transport means for frictionally engaging a section of the movie film, said transport means being arranged in the film transport path and connected to a drive device said transport means moving said movie film continuously or intermittently past a picture window;
a pressing device for pressing the movie film against the film transport means, wherein the movie film is moved between said pressing device and said film transport means;
at least another film transport means for frictionally engaging said movie film, said another transport means being in the film transport path and connected to a drive device, said another transport means moving said movie film continuously or intermittently; and
another pressing device for pressing the movie film against said another film transport means, wherein the movie film is moved between said another pressing device and said another film transport means, wherein said film transport means and said pressing device form a feed device and said another transport means and said another pressing device form a take-up device, wherein the feed device and the take-up device are arranged on either side of the picture window, wherein at least one deflection roller and a compensation roller, which compensates for the film transport movement of the feed and take-up device, are arranged in the film transport path of the movie film between the feed and take-up device and feed and take-up plates, which hold the movie film.

23. The apparatus of claim 22, wherein the compensation roller is spring-loaded.

* * * * *

UNITED STATES PATENT AND TRADEMARK OFFICE
CERTIFICATE OF CORRECTION

| | |
|---|---|
| PATENT NO. | : 7,857,453 B2 |
| APPLICATION NO. | : 11/631500 |
| DATED | : December 28, 2010 |
| INVENTOR(S) | : Josef Handler |

It is certified that error appears in the above-identified patent and that said Letters Patent is hereby corrected as shown below:

On the Title Page

(73) Assignee     Delete "Arnold & Richter Cine Technik GmbH & Co."
Insert -- Arnold & Richter Cine Technik GmbH & Co., Betriebs KG --

Signed and Sealed this
Twenty-sixth Day of July, 2011

David J. Kappos
*Director of the United States Patent and Trademark Office*